(12) United States Patent
Nitta et al.

(10) Patent No.: US 8,155,691 B2
(45) Date of Patent: Apr. 10, 2012

(54) MOBILE COMMUNICATION SYSTEM

(75) Inventors: Daisuke Nitta, Kawasaki (JP); Tetsuo Tomita, Kawasaki (JP); Tomonori Kumagai, Kawasaki (JP); Satoshi Watanabe, Kawasaki (JP); Kazunari Kobayashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 451 days.

(21) Appl. No.: 12/260,174

(22) Filed: Oct. 29, 2008

(65) Prior Publication Data
US 2009/0239561 A1 Sep. 24, 2009

(30) Foreign Application Priority Data
Mar. 19, 2008 (JP) ................. 2008-070618

(51) Int. Cl.
*H04B 7/00* (2006.01)
*H04Q 7/20* (2006.01)

(52) U.S. Cl. ......... 455/524; 455/449; 455/525; 455/425

(58) Field of Classification Search .................. 455/445, 455/449, 452.1, 446, 454, 444, 432.3, 434, 455/435.1, 507, 515, 415, 422.1, 425, 514, 455/524, 525, 420; 370/338, 331
See application file for complete search history.

(56) References Cited

U.S. PATENT DOCUMENTS

| | | | |
|---|---|---|---|
| 5,459,727 A | 10/1995 | Vannucci | |
| 5,513,184 A | 4/1996 | Vannucci | |
| 2007/0242637 A1* | 10/2007 | Dynarski et al. | 370/331 |
| 2007/0270152 A1* | 11/2007 | Nylander et al. | 455/445 |
| 2009/0046679 A1* | 2/2009 | Isobe et al. | 370/338 |

FOREIGN PATENT DOCUMENTS

| | | |
|---|---|---|
| EP | 1 883 254 | 1/2008 |
| JP | 4-337997 | 11/1992 |
| JP | 2004-179981 | 6/2004 |
| WO | 01/72015 | 9/2001 |
| WO | 2007/136339 | 11/2007 |

OTHER PUBLICATIONS

European Search Report dated Mar. 25, 2009, from the corresponding European Application.
Kim Dongwoo, et al. "An Efficient Paging Scheme for Overlaid Microcell/Macrocell Systems" Universal Personal Communications, vol. 2, Sep. 29, 1996, pp. 961-964.

(Continued)

*Primary Examiner* — John J Lee
(74) *Attorney, Agent, or Firm* — Fujitsu Patent Center

(57) ABSTRACT

A base station accommodation method and mobile communication system which allows the installation of many microminiature BTS devices are provided. The mobile communication system includes a plurality of base stations which accommodate a plurality of mobile terminals respectively; a plurality of first base station control devices, each of which accommodates a predetermined number of base stations out of the plurality of base stations; and a second base station control device which accommodates the plurality of first base station control devices, wherein each of the plurality of first base station control devices comprises, for supporting information identifying a mobile terminal, a mobile terminal data base to store identification information which identifies a base station to which the mobile terminal is subordinate, and a station data base to store an address of the base station.

12 Claims, 20 Drawing Sheets

OTHER PUBLICATIONS

"Universal Mobile Telecommunications System (UMTS); UTRAN Iur interface Radio Network Subsystem Application Part (RNSAP) signalling (3GPP TS 25.423 version 7.6.0 Release 7) ETSI TS 125 423" ETSI Standards, vol. 3-R3, No. V7.6.0, Oct. 1, 2007.

Picochip Designs Ltd. "The Case for Home Base Stations" retrieved from http://www.picochip.com/downloads/27c85c984cd0d348edcffe7413f6ff79/femtocell_wp.pdf on Apr. 1, 2007.

"[3GSM: Continued Report] Samsung Korea and NEC Exhibit "Fennto Cell"" Nikkei Business Publications, Feb. 20, 2007.

"Manufacturing Agreement for ZoneGate Low-Cost Residential 3G Access Point" Nov. 1, 2006.

Hidehiko Ohyane, et al. "Base Station Supporting IP Transport" Special Articles on IP-based RAN for Economical and Flexible Network Construction, NTT DoCoMo, Technical Journal, vol. 9, No. 1, p. 7-13, Apr. 1, 2007.

"Chinese Office Action" mailed by CPO and corresponding to Chinese application No. 200810179431.3 on Apr. 20, 2011, with English translation.

* cited by examiner

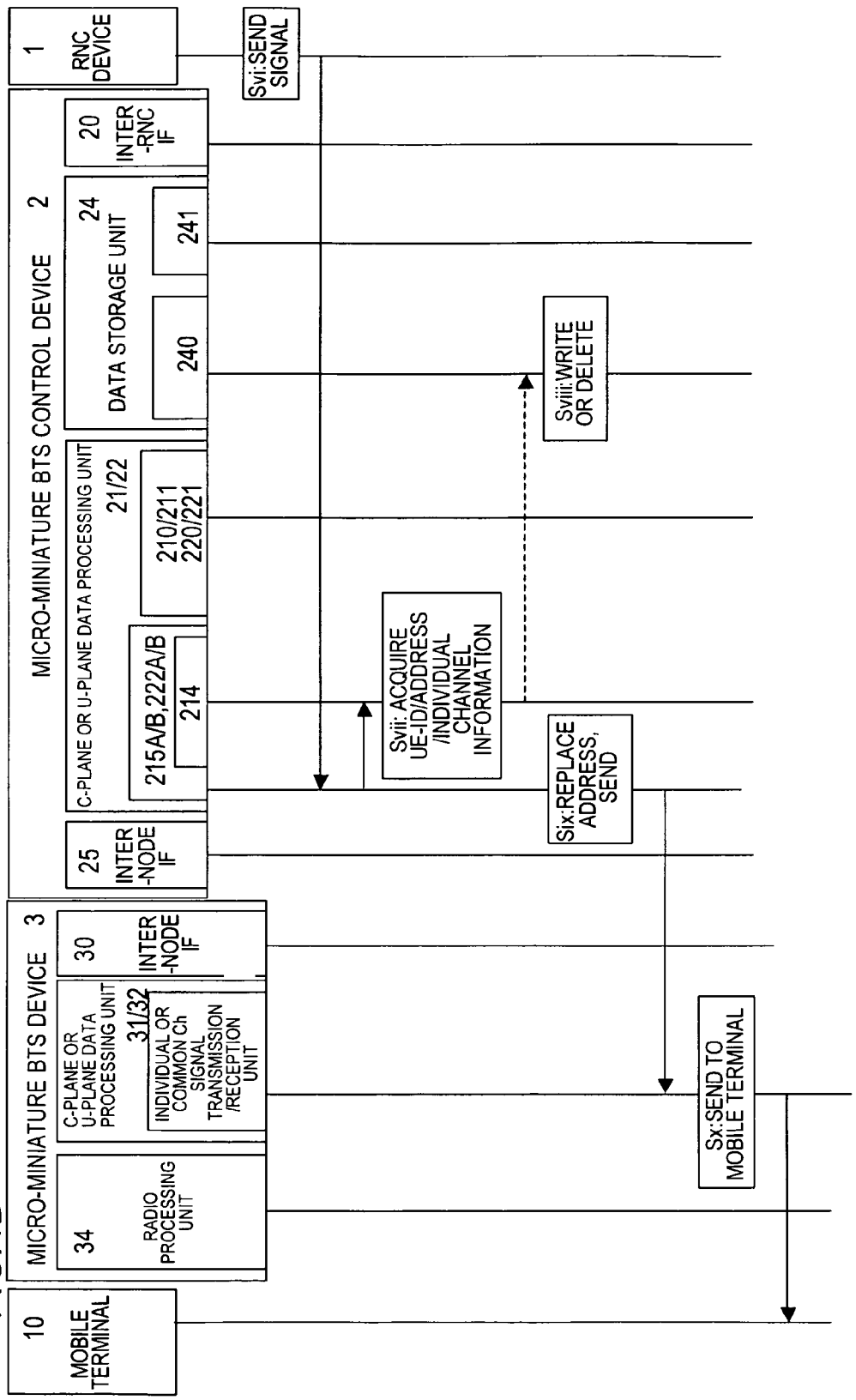

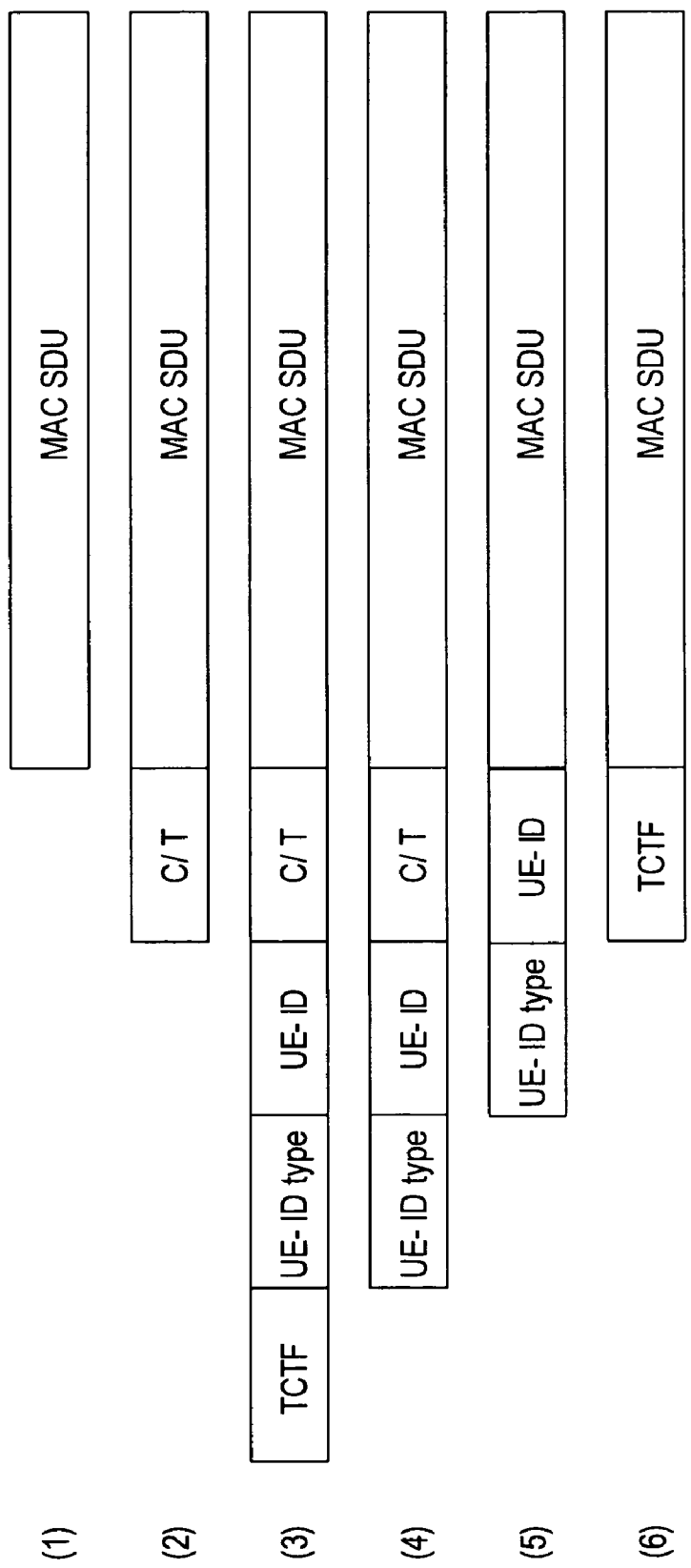

FIG.6

| I ITEM NUMBER | II LOGICAL CHANNEL | III TRANSPORT CHANNEL | IV MULTIPLEX | V CORRESPONDENCE WITH FIG. 5 |
|---|---|---|---|---|
| 1 | DTCH/DCCH | DCH | INDIVIDUAL CHANNELS NOT MULTIPLEXED | (1) |
| 2 | | | INDIVIDUAL CHANNEL MULTIPLEXED | (2) |
| 3 | | RACH/FACH | - | (3) |
| 4 | | DSCH | MULTIPLEXED | (4) |
| 5 | | | NOT MULTIPLEXED | (5) |
| 6 | BCCH | BCH | - | (1) |
| 7 | | FACH | - | (6) |
| 8 | PCCH | PCH | - | (1) |
| 9 | CCCH | RACH/FACH | - | (6) |
| 10 | CTCH | FACH | - | (6) |

FIG.7

| COMPOSING ELEMENT | PURPOSE |
|---|---|
| TCTF(Target Channel Type Field) | USED FOR IDENTIFICATION OF LOGICAL CHANNEL ON FACH AND RACH |
| UE-ID Type | UE-ID TYPE TO BE USED |
| UE-ID | ID OF UE |
| C/T | USED FOR IDENTIFICATION OF LOGICAL CHANNEL IN INDIVIDUAL TRANSPORT CHANNEL, AND IDENTIFICATION OF LOGICAL CHANNEL WHEN USER DATA IS TRANSMITTED VIA RACH/FACH |
| MAC SDU | PAYLOAD DATA OF MAC |

FIG.8

| HEADER TYPE OF MAC DATA PDU | INFORMATION ELEMENT TO SPECIFY MOBILE TERMINAL |
|---|---|
| (1) | RECORD IN MAC SDU (EQUIVALENT TO UE-ID) |
| (2) | RECORD IN MAC SDU (EQUIVALENT TO UE-ID) |
| (3) | RECORD IN UE-ID |
| (4) | RECORD IN UE-ID |
| (5) | RECORD IN UE-ID |
| (6) | RECORD IN MAC SDU (EQUIVALENT TO UE-ID) |

FIG.9

| UE-ID (A PLURALITY OF TYPES OF IDs CAN BE RECORDED) | MICRO-MINIATURE BTS CONTROL DEVICE ADDRESS (PORT NUMBER) | INDIVIDUAL CHANNEL IP ADDRESS (PORT NUMBER)#1 | INDIVIDUAL CHANNEL IP ADDRESS (PORT NUMBER)#2 | ... | INDIVIDUAL CHANNEL IP ADDRESS (PORT NUMBER)#n |
|---|---|---|---|---|---|
| 000001 | 10.10.10.1 (10001) | 10.15.10.1 (10001) | - | ... | - |
| 000021 | 10.10.10.21 (10021) | 10.15.10.21 (10021) | 10.15.15.21 (10021) | ... | - |
| ... | ... | ... | ... | ... | ... |
| 001255 | 10.10.12.55 (11255) | - | - | ... | - |

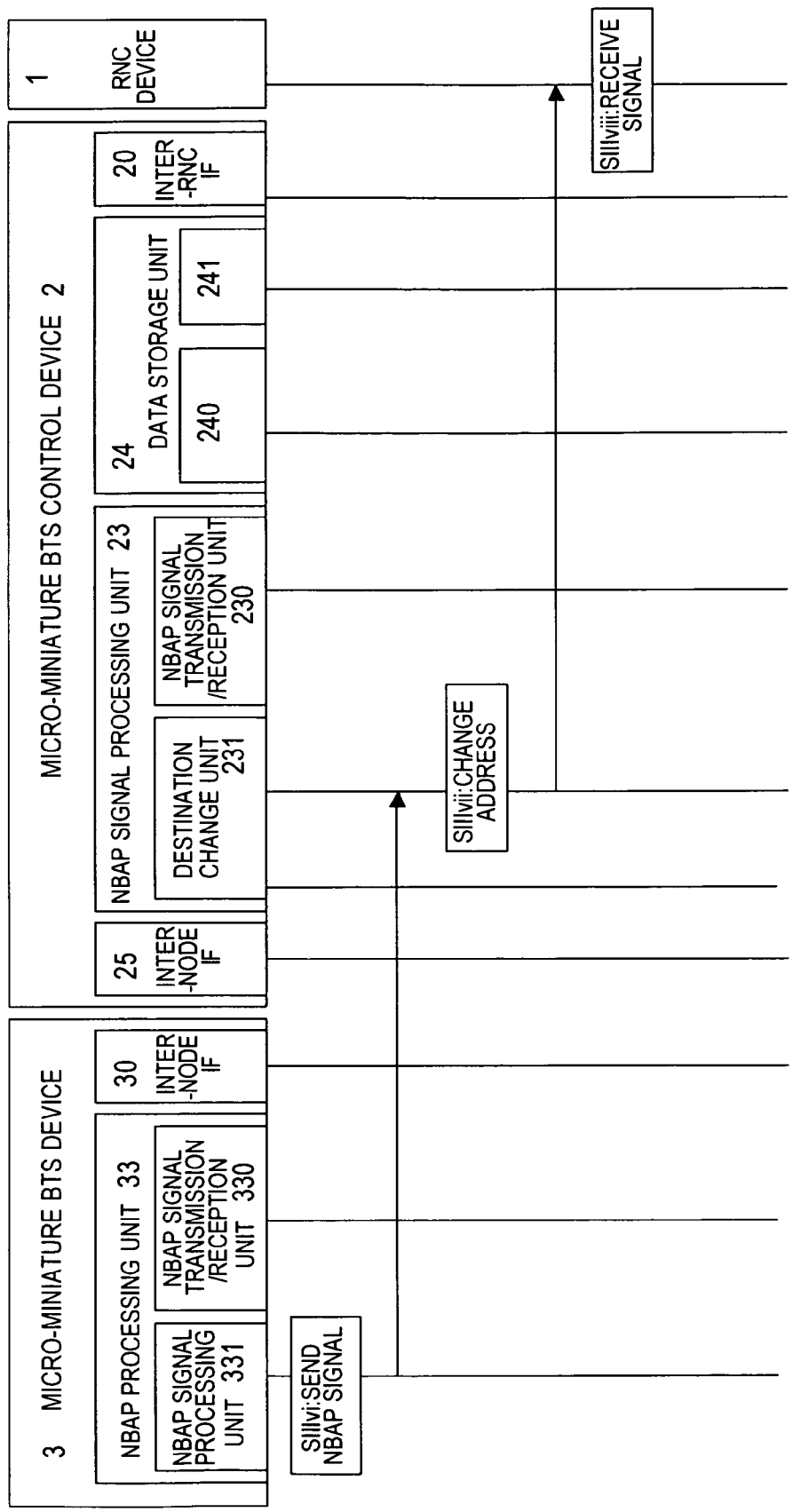

MOBILE COMMUNICATION SYSTEM

CROSS-REFERENCE TO RELATED APPLICATIONS

This application is based upon and claims the benefit of priority of the prior Japanese Patent Application No. 2008-070618, filed on Mar. 19, 2008, the entire contents of which are incorporated herein by reference.

FIELD

The present invention discussed herein is directed to a mobile communication system having a base station and base station control device.

BACKGROUND

The spread of W-CDMA (Wideband Code Division Multiple System) type mobile communication systems is so obvious that the population coverage of W-CDMA type mobile communication system is nearly 100%. On the other hand, the coverage of W-CDMA type mobile communication system for indoor use is as yet not high. This is because radio waves do not easily enter from outdoors to indoors, and cost is high to install and operate a base station for indoor use.

In this environment, a base station (BTS: Base Transceiver Station), called a "femto cell", which is smaller than a conventional base station, has recently been made available. It is assumed that this micro-miniature base station (hereafter called micro-miniature BTS device) will be used in a home or office, and supports W-CDMA, enables simultaneous communication for about 4 users, and is inexpensive.

By installing this micro-miniature BTS device in skyscrapers and in underground facilities which conventional base stations cannot fully cover, indoor coverage can be improved without increasing operation cost.

However, for a general mobile communication system depicted as a related art in FIG. 1, to control base stations, it is necessary to accommodate base stations BTS #1, #2, ... #n by a base station control device (RNC: Radio Network Controller, hereafter called "RNC device") 1, which is connected to the core network CN. However the number of base stations BTS #1, #2, ... #n which one RNC device 1 can control is limited, and this number is roughly several hundred.

First of all, a publically known technology is an invention disclosed in Japanese Laid-open Patent Publication No. 4-337997.

The invention disclosed in Japanese Laid-open Patent Publication No. 4-337997 is a communication system using femto cells. For the connection of femto cells, however, only connections between an RNC device and base stations are referred to.

Another publically known technology is an invention disclosed in Japanese Laid-open Patent Publication No. 2004-179981. According to this invention, neighborhood mobile terminals form a group, where a plurality of mobile terminals transmit and receive voice and packets as if they are one pseudo-terminal. However, this technology makes mobile terminals "appear" as one terminal at the network side, and in the disclosure of this invention nothing is mentioned on how to manage base stations.

Therefore, a new accommodating method is necessary to accommodate many (e.g. several thousand) micro-miniature BTS devices.

SUMMARY

With the foregoing in view, according to an aspect of the invention, a mobile communication system includes base stations and base station control devices, and has a plurality of base stations accommodating a plurality of mobile terminals respectively, a plurality of first base station control devices accommodating a predetermined number of base stations out of the above mentioned plurality of base stations respectively, and a second base station control device which accommodates the plurality of first base stations control devices. Each of the plurality of first base stations control devices further has, for supporting information to identify a mobile terminal, a mobile terminal data base which stores identification information on a base station to which a mobile terminal is subordinate, and a station data base which stores an address of the base station.

The plurality of base stations are micro-miniature base stations, and the plurality of first base station control devices are micro-miniature base station control devices, and the second base station control device is connected to a core network.

It is to be understood that both the foregoing general description and the following detailed description are exemplary and explanatory only and are not restrictive of the invention, as claimed.

Additional objects and advantages of the invention (embodiment) will be set forth in part in the description which follows, and in part will be obvious from the description, or may be learned by practice of the invention. The object and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

FIG. 4B is a diagram depicting a sequence example among each device in (1) transmission and other call control processing from the RNC device 1 to mobile terminal 10;

FIG. 5 shows an example of the header format of MAC Data PDU, which is a signal to be transmitted;

FIG. 6 shows a table where the six types of header formats of MAC data PDU are used depending on the type of logical channel and transport channel as shown in FIG. 5;

FIG. 7 shows a correspondence of a composing element of the header in FIG. 5 and its purpose;

FIG. 8 is a diagram depicting the information to specify the mobile terminal 10 corresponds to the information element to specify a mobile terminal in the MAC Data PDU;

FIG. 9 is an example of the recording format of the mobile terminal data base 240;

FIG. 16B is a diagram depicting a sequence example among each device in (4) NBAP processing between micro-miniature BTS control device 2 and micro-miniature BTS device 3 and shows the flow of signals from the micro-miniature BTS device 3 to the RNC device 1.

DESCRIPTION OF EMBODIMENTS

Embodiments will now be described with reference to the drawings.

Figure 1:
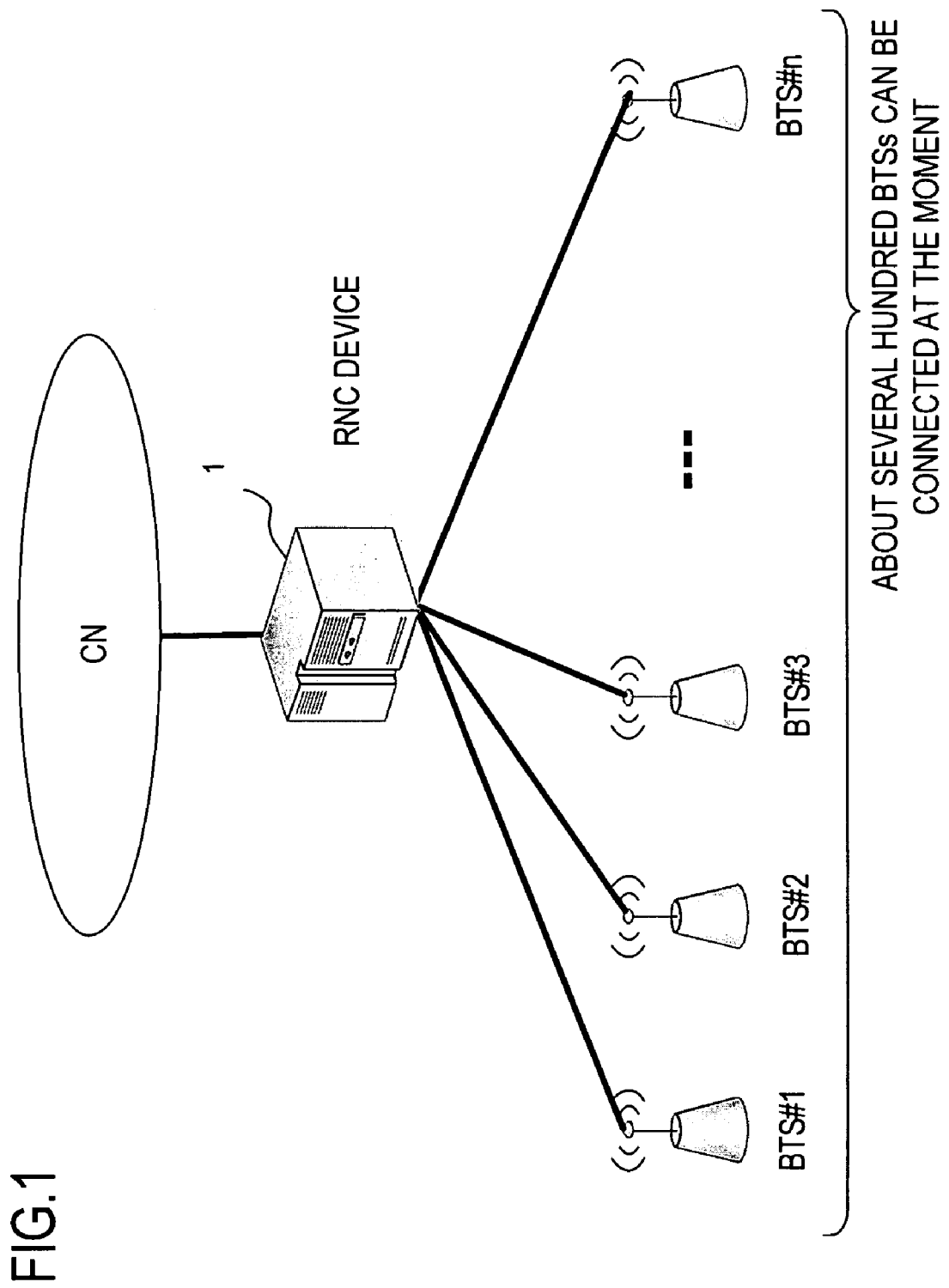
FIG. 1 shows a general mobile communication system.
Figure 2:
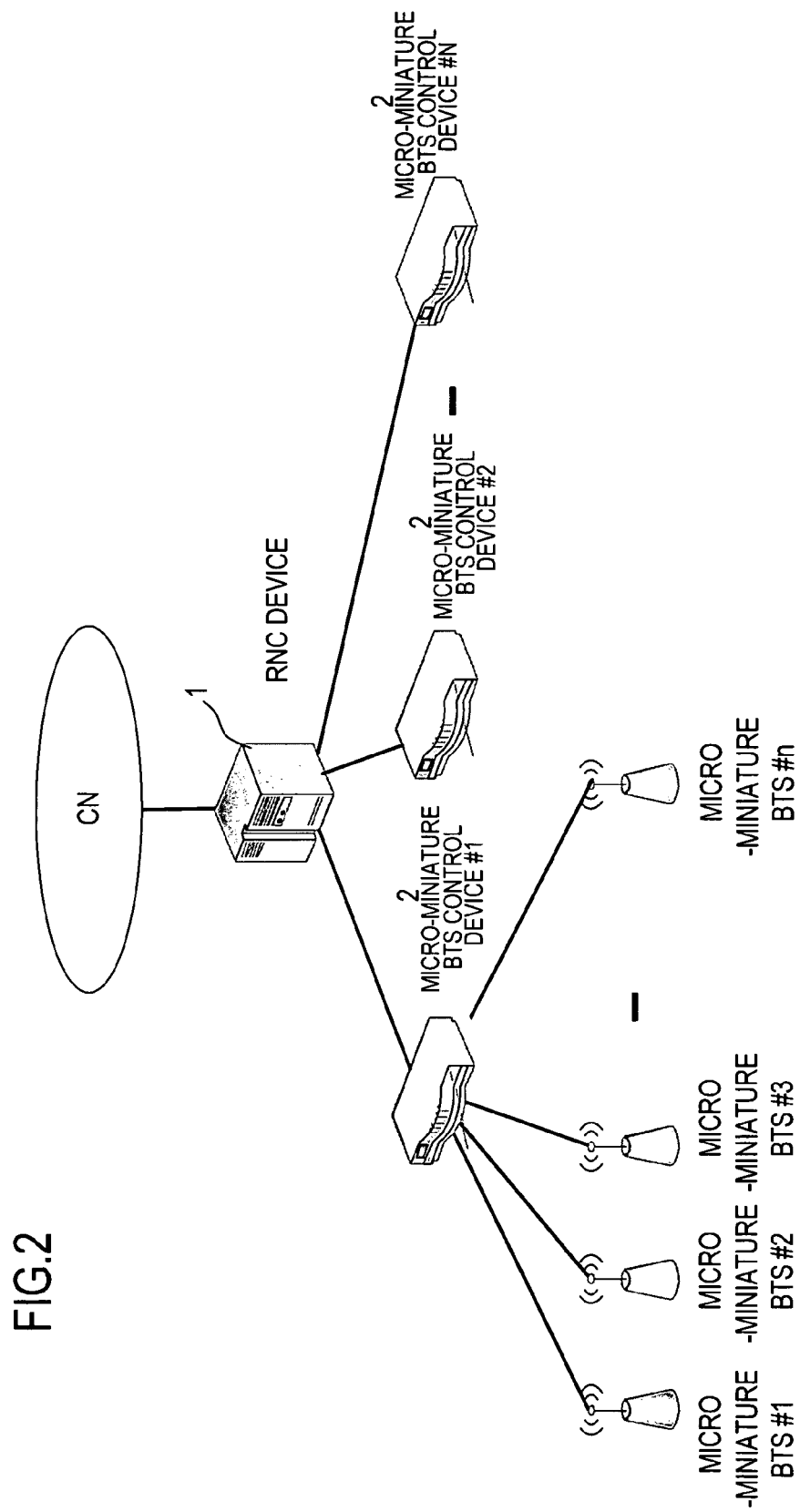
FIG. 2 is a diagram depicting an embodiment of the mobile communication system.

FIG. 2 is a diagram depicting an embodiment of the mobile communication system.

A plurality of mobile terminals are subordinate respectively to a plurality of base station BTSs (#1 to #n). An example of a plurality of base station BTSs (#1 to #n) is a micro-miniature base station to which at most several mobile terminals are subordinate respectively.

A plurality of base station BTSs (#1 to #n) are connected to first base station control devices 2 (#1 to #n) corresponding to a predetermined number of base station BTSs (#1 to #n). And micro-miniature base station control devices (micro-miniature BTS control devices) are applied to the plurality of first base station control devices 2.

The plurality of first base station control devices, that is, micro-miniature BTS control devices 2 (#1 to #N) are connected to a second base station control device (RNC device) 1. This second base station control device, that is, the RNC device 1, is a conventional base station control device, and is connected to a core network CN.

Figure 3A:
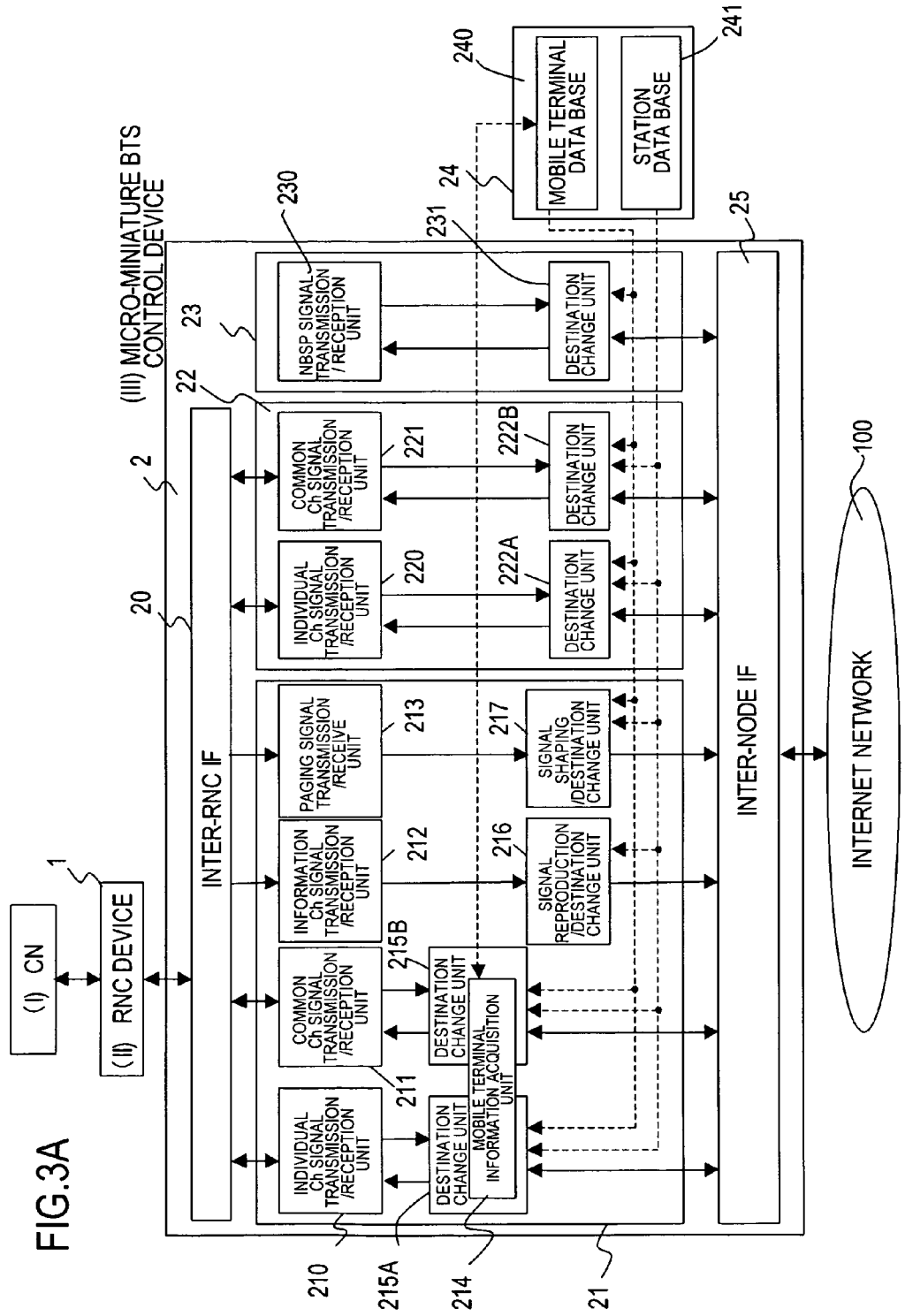
FIG. 3A shows a connection between the RNC device 1 and micro-miniature BTS control device 2.
Figure 3B:
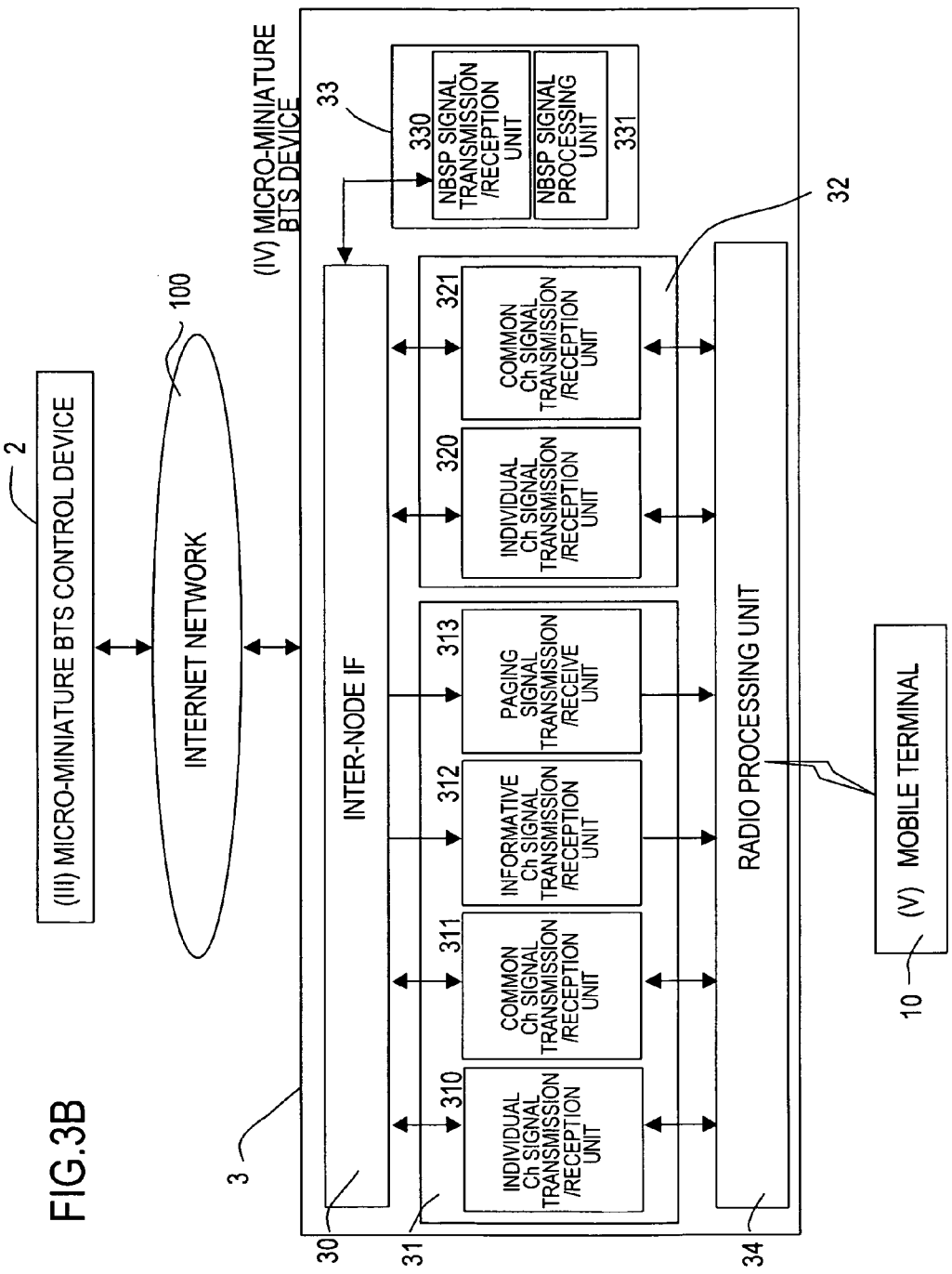
FIG. 3B shows a connection between the micro-miniature BTS control device 2 and micro-miniature BTS device 3.

FIG. 3A and FIG. 3B are diagrams depicting a configuration example and a connection example of the RNC device 1, micro-miniature BTS control device 2 and micro-miniature BTS device 3 in FIG. 2 respectively. FIG. 3A shows a connection between the RNC device 1 and micro-miniature BTS control device 2, and FIG. 3B shows a connection between the micro-miniature BTS control device 2 and micro-miniature BTS device 3.

In FIG. 3A, a core network (CN: core network: I in FIG. 3A) is a generic phrase referring to a network device that is higher than the RNC device 1 (II in FIG. 3A) in the W-CDMA network, performing management of subscriber information, monitoring/managing each network device, and connecting with another network.

The RNC device 1 is a device for controlling base stations, distributing signals of call control plane (C-Plane) data (including NBAP data) and user information transmission plane (U-Plane) data.

The micro-miniature BTS control device 2 (III in FIG. 3A) is a device which can accommodate a plurality of micro-miniature BTS device 3 via the network 100, such as the Internet, and an interface (IF) with the RNC device 1 is the same as an interface with a regular base station device.

The micro-miniature BTS control device 2 has an inter-RNC interface IF 20, C-Plane data processing unit 21, U-Plane data processing unit 22, NBAP signal processing unit 23, data storage unit 24 and inter-node interface IF 25 as the functional units.

The inter-RNC interface IF 20 is an interface (IF) with the RNC device 1, and transmits/receives signals of the C-Plane data (including NBA data) and U-Plane data.

[C-Plane Data Processing Unit 21]

The C-Plane data processing unit 21 receives a call control signal on a mobile terminal 10 (V in FIG. 3B), which is sent from the RNC device 1, identifies the mobile terminal number, then sends the call control signal to the micro-miniature BTS device 3 to which this mobile terminal 10 is subordinate. The C-Plane data processing unit 21 also sends the C-Plane data which is sent from the micro-miniature BTS device 3 to the RNC device 1.

Now each functional unit of the C-Plane data processing unit 21 will be described.

An individual channel signal transmission/reception unit 210 transmits/receives a signal on an individual channel, out of the call control signals transmitted to/received from the RNC device 1.

A common channel signal transmission/reception unit 211 transmits/receives a signal on a common channel, out of the call control signals transmitted to/received from the RNC device 1.

An informative channel signal transmission/reception unit 212 transmits/receives a signal on an informative channel out of the call control signals transmitted to/received from the RNC device 1.

A paging signal transmission/reception unit 213 transmits/receives a signal on a paging (call up) channel out of the call control signals transmitted to/received from the RNC device 1.

A mobile terminal information acquisition unit 214 traces a signal of an individual/common channel transmitted to/received from the individual channel signal transmission/reception unit 210 and the common channel signal transmission/reception unit 211, and detects setup information on an individual channel which is set in a mobile terminal 10. Further, the mobile terminal information acquisition unit 214 records this information in a mobile terminal data base 240 of the data storage unit 24. When a call processing of the mobile terminal 10 ends, the mobile terminal information acquisition unit 214 deletes the setup information on an individual channel from the mobile terminal data base 240.

A destination change unit 215A/215B determines, for the data transmitted from the RNC device 1, a user ID (UE-ID: User Equipment IDentification) and a micro-miniature BTS device 3 to which the mobile terminal 10 is subordinate, based on the mobile terminal data base 240 of the data storage unit 24, and sends the data to the address of this micro-miniature BTS device 3 based on a station data base 241 of the data storage unit 24.

For the data received from the micro-miniature BTS device 3 (IV in FIG. 3B), the destination of the data is changed to the address of the RNC device 1, and the data is transmitted again.

A signal reproduction/destination change unit 216 reproduces the received informative signal since the informative signal must be transmitted to all the connected micro-miniature BTS devices 3, and sends the signal to the destinations written in the station data base 241 of the data storage unit 24.

A signal shaping/destination change unit 217 extracts a paging on a mobile terminal 10 which is subordinate to a connected micro-miniature BTS device 3 from a paging signal received by the paging signal transmission/reception unit 213, shapes the paging to a paging signal in a unit of the micro-miniature BTS device 3, changes the destination to each micro-miniature BTS device 3, and transmits the signal.

[U-Plane Data Processing Unit 22]

The U-Plane data processing unit 22 receives U-Plane data on a mobile terminal 10, which is sent from the RNC device 1, identifies the mobile terminal number, then sends the received data to a micro-miniature BTS device 3 to which this mobile terminal 10 is subordinate. The U-Plane data processing unit 22 also sends the U-Plane data sent from the micro-miniature BTS device 3 to the RNC device 1.

Now each functional unit of the U-Plane data processing unit 22 will be described.

An individual channel signal transmission/reception unit 220 transmits/receives U-Plane data of an individual channel. A common channel signal transmission/reception unit 221 transmits/receives U-Plane data of a common channel.

A destination change unit 222A/222B determines, for the data transmitted from the RNC device 1, a user ID and a micro-miniature BTS device 3 to which the mobile terminal 10 is subordinate, based on the mobile terminal data base 240 of the data storage unit 24, and sends the data to the address of this micro-miniature BTS device 3 based on a station data base 241 of the data storage unit 24. For the data received from the micro-miniature BTS device 3, the destination change unit 222A/222B changes the destination of the data to the address of the RNC device 1, and sends the data again.

[NBAP Signal Processing Unit 23]

The NBAP signal processing unit 23 performs processing on an NBAP signal, which is a signal subject to base station control, out of C-Plane signals. An NBAP signal transmission/reception unit 230 of the NBAP signal processing unit 23 transmits/receives the NBAP signal.

A destination change unit 231 determines, for the data transmitted from the RNC device 1, a target micro-miniature BTS device 3 based on the mobile terminal data base 240 of the data storage unit 24 and the station data base 241 of the data storage unit 24, and sends the data to the address of this micro-miniature BTS device 3. For the data received from the micro-miniature BTS device 3, the destination of the data is changed to the address of the RNC device 1, and the data is transmitted again.

[Data Storage Unit 24]

The data storage unit 24 stores two types of data: mobile terminal data base 240 and station data base 241.

The mobile terminal data base 240 is a data base storing an identifier (user ID: UE-ID) of a mobile terminal 10, an IP address of this mobile terminal 10, an identification ID of a micro-miniature BTS device 3 to which the mobile terminal 10 is subordinate, and other information. This mobile terminal data base 240 is detected by a mobile terminal information acquisition unit, which is not illustrated, in the micro-miniature RNC control device 2, and is updated and recorded when necessary.

The station data base 241 is a data base storing an identification ID and IP address of the micro-miniature BTS device 3, corresponding cell numbers and other information, and is recorded when the system is installed.

[Inter-Node Interface If 25]

The inter-node interface IF 25 is an interface IF with the micro-miniature BTS device 3, and transmits/receives signals of the C-Plane data (including NBAP data), U-Plane data and other information.

Now a micro-miniature BTS device 3 (IV in FIG. 3) connected with the micro-miniature BTS control device 2 via the Internet network 100 and a configuration example thereof will be described.

The micro-miniature BTS device 3 is a base station (BTS: Base Transceiver Station) which accommodates a plurality of mobile terminals 10, and the differences from a regular base station are as follows.

The number of mobile terminals that can be accommodated is few (about 10 units). A regular base station can connect and accommodate several hundred mobile terminals.

The number of cells is few (about 1 cell). A regular base station has around 3 to 24 cells.

The radio wave coverage range is narrow (about several tens m). But is about 3 km in the case of a regular base station.

The micro-miniature BTS device 3 has an inter-node interface IF 30, a C-Plane data processing unit 31, a U-Plane data processing unit 32, an NBAP signal processing unit 33 and a radio processing unit 34.

Now each functional unit of the micro-miniature BTS device 3 will be described in details.

[Inter-Node Interface IF 30]

The inter-node interface IF 30 is an interface IF with a micro-miniature BTS control device 2, and transmits/receives signals of the C-Plane data (including NBAP data), U-Plane data and other information.

[C-Plane Data Processing Unit 31]

The C-Plane data processing unit 31 of the micro-miniature BTS device 3 receives a call control signal on a mobile terminal 10, which is sent from the micro-miniature BTS control device 2, and sends the signal to this mobile terminal 10. The C-Plane data processing unit 31 also sends C-Plane data, which is sent from a mobile terminal 10 to the micro-miniature BTS device 3, to the micro-miniature BTS control device 2.

Operations of the functional units of the C-Plane data processing unit 31 are as follows.

An individual channel signal transmission/reception unit 310 transmits/receives signals on an individual channel, out of call control signals which are transmitted to/received from the micro-miniature BTS control device 2.

A common channel signal transmission/reception unit 311 transmits/receives signals on a common channel, out of the call control signals which are transmitted to/received from the micro-miniature BTS control device 2.

An informative channel signal transmission/reception unit 312 transmits/receives signals on an informative channel, out of the call control signals which are transmitted from the micro-miniature BTS control device 2.

A paging signal transmission/reception unit 313 transmits/receives signals on a paging (call up) channel, out of the call control signals which are transmitted from the micro-miniature BTS control device.

[U-Plane Data Processing Unit 32]

The U-Plane data processing unit 32 receives U-Plane data on a mobile terminal 10, which is sent from the micro-miniature BTS control device 2, then sends the data to a mobile terminal 10. The U-Plane data processing unit 32 also sends U-Plane data sent from a mobile terminal 10 to the micro-miniature BTS control device 2.

An individual channel signal transmission/reception unit 320 of the U-Plane data processing unit 32 transmits/receives U-Plane data of an individual channel. A common channel signal transmission/reception unit 321 transmits/receives the U-Plane data of a common channel.

[NBAP Signal Processing Unit 33]

The NBAP signal processing unit 33 performs processing on an NBAP signal, which is a signal subject to base station control, out of C-Plane signals.

An NBAP signal transmission/reception unit 330 of the NBAP signal processing unit 33 transmits/receives the NBAP signal. An NBAP signal processing unit 331 is a component which actually processes an NBAP signal (signal termination unit).

[Radio Transmission/Reception Processing Unit (RF/Base Band Processing Unit) 34]

A radio transmission/reception processing unit 34 is an interface with a mobile terminal 10, and transmits/receives signals of C-Plane data and U-Plane data.

[Mobile Terminal 10]

A mobile terminal 10 is a terminal used by a user, and is a call processing termination component.

A flow of signal processing in the configuration of the above mentioned embodiment of the mobile communication system will now be described.

The flow of signal processing is classified into the following four operations.

[(1) transmissions and other call control processing from mobile terminal 10]
[(2) paging (callup) processing to mobile terminal 10]
[(3) informative data processing to mobile terminal 10]
[(4) NBAP processing between micro-miniature BTS control device 2 and micro-miniature BTS device 3]

These four signal processing operations respectively will now be described in detail.

In (1) transmissions and other call control processing from mobile terminal 10, transmission and other call control processing are performed between a mobile terminal 10 and RNC device 1 (or higher device). In this case, various signals are processed in the micro-miniature BTS device 3 and micro-miniature BTS control device 2.

Figure 4A:
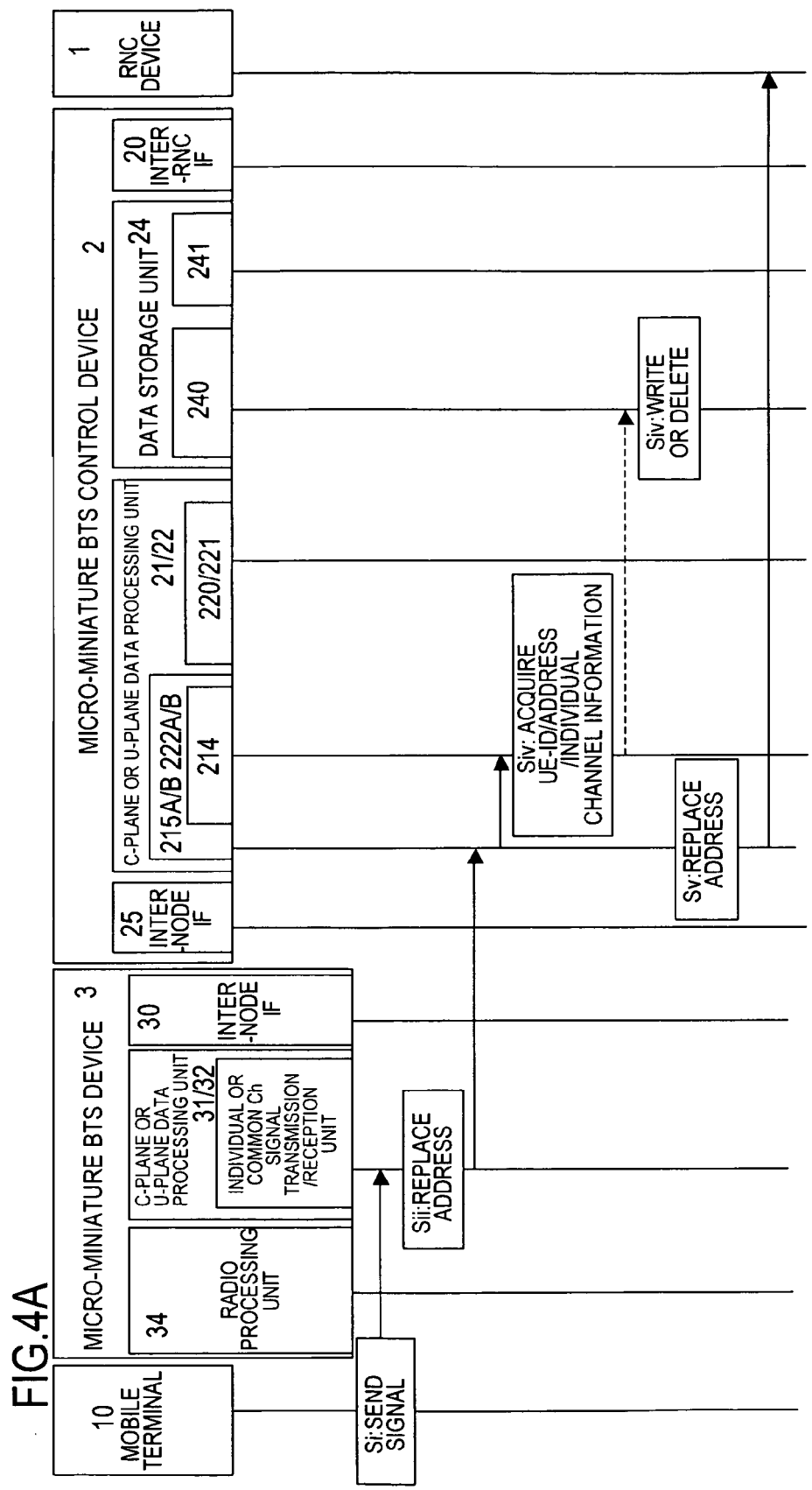
FIG. 4A is a diagram depicting a sequence example among each device in (1) transmission and other call control processing from mobile terminal 10 and shows the flow of signals from the mobile terminal 10 to the RNC device 1.

FIG. 4A and FIG. 4B are diagrams depicting a sequence example among each device in (1) transmission and other call control processing from mobile terminal 10.

In FIG. 4A, the reference symbols Si to Sv show the flow of signals from the mobile terminal 10 to the RNC device 1.

Si: a transmission signal is sent from the mobile terminal 10 to a functional unit corresponding to the logical channel/transport channel, that is, a C-Plane or U-Plane data processing unit 31 and 32, via the radio processing unit 34 of the micro-miniature BTS device 3.

There are 6 types of header formats of MAC data PDU, which is a signal to be transmitted, as shown in FIG. 5, and these header formats are used depending on the type of logical channel and transport channel, as the table in FIG. 6 shows.

In the table in FIG. 6, column V shows a reference number (1) to (6) in FIG. 5 at a position of a corresponding item. FIG. 7 shows a correspondence of a composing element of the header in FIG. 5 and its purpose. Description continues from FIG. 4A.

Sii: The micro-miniature BTS device 3 receives the signal sent in Si using the C-plane or U-Plane data processing unit 31/32, which is a functional unit corresponding to a logical channel/transport channel. Then the micro-miniature BTS device 3 sends the received signal in MAC format to the inter-node interface IF 25 of the micro-miniature BTS control device 2 via the inter-node interface IF 30. The MAC format, which is transmitted at this time, is shown in FIG. 5, as described for Si.

If the transmission type between the micro-miniature BTS device 3 and the micro-miniature BTS control device 2 is IP packets at this time, addresses are attached such that the transmission source address becomes the micro-miniature BTS device 3, and the transmission destination address becomes the micro-miniature BTS control device 2.

Siii: Then the micro-miniature BTS control device 2 receives the transmission signal in Sii using the inter-node interface IF 25, and sends it to the destination change unit 215A/B or 222A/B corresponding to the logical channel/transport channel.

If the transmission type between the micro-miniature BTS control device 2 and the RNC device 1 is IP packets at this time, the transmission source address is changed to the micro-miniature BTS control device 2, and the transmission destination address is changed to the RNC device 1, and the signal is sent to a higher level transmission/receive units 210 to 212, 220 and 221.

Siv: During the processing in Siii, the mobile terminal information acquisition unit 214 acquires information to specify the mobile terminal 10 from the transmitted data, that is, information on UE-ID, address and individual channel, for example. Then the mobile terminal information acquisition unit 214 records the acquired information to specify the mobile terminal 10 to the mobile terminal data base 240 of the data storage unit 24. If the same data has been recorded, this recording is omitted. If there is a difference, the stored data is updated.

For transmission data, there are six types of header formats of MAC Data PDU in FIG. 5, as shown in Si, and the information to specify the mobile terminal 10 corresponds to the information element to specify a mobile terminal in the MAC Data PDU, as shown in the table in FIG. 8, for example.

The correspondence shown in FIG. 8 is an example, and if an ID is acquired by another method (using the mobile terminal ID for paging in the MAC SDU), the ID is recorded in the mobile terminal data base 240.

If the transmission type between the micro-miniature BTS control device 2 and the RNC device 1 is IP packets, the transmission source address and the port number are also recorded in the mobile terminal data base 240. If information that a new individual channel (C-Plane/U-Plane) is set is included in the transmission data, UE-ID, IP address and port number of the newly set individual channel are recorded in the mobile terminal data base 240.

An example of the recording format of the mobile terminal data base 240 is shown in FIG. 9.

If information that an individual channel (C-Plane/U-Plane) is deleted is included in the transmission data, information on the deleted individual channel is deleted from the mobile terminal data base 240. Even if information on all the individual addresses is deleted, the information on UE-ID itself (the first column in FIG. 9) is not deleted from the data base 240.

Sv: Each channel signal transmission/reception unit which received the data in Sii replaces the transmission destination address with an address to the RNC device 1, and sends the receive data to the RNC device 1 via the inter-RNC interface IF 20.

FIG. 4B is a diagram depicting the flow (Svi to Sx) of signals from the RNC device 1 to the mobile terminal 10. The signal flow will now be described with reference to FIG. 4B.

Svi: A signal transmitted from the RNC device 1 is received by the channel transmission/reception unit 210/211, 220/221, corresponding to the logical channel/transport channel, via the inter-RNC interface IF 20 of the micro-miniature BTS control device 2, and is sent to the destination change unit 215A/B and 222A/B.

Svii: The destination change unit 210/211, 220/221, which received the transmission signal in Svi, performs processing similar to that in Siii.

Sviii: Based on the user ID (UE-ID) specified in Svii, the transmission source address and port number are changed to the information on the micro-miniature BTS control device 2, and the transmission destination address and port number are changed to the address recorded in the mobile terminal data base 240 if the transmission type between the micro-miniature BTS control device 2 and micro-miniature BTS device 3 is IP packets. If there are a plurality of individual channel addresses, at this time, the transmission destination address is determined using the port number of the receive data.

Six: The data updated in Sviii is sent to the micro-miniature BTS device 3 via the inter-node interface IF 25.

Sx: The micro-miniature BTS device receives the signal transmitted in Si via the inter-node interface IF 30, using the functional unit 31/32 corresponding to the logical channel/transport channel, and sends the signal to the mobile terminal 10 via the radio processing unit 30.

In (2) paging (callup) processing to mobile terminal 10, processing to send the paging signal, which is transmitted from the RNC device 1, is sent to each micro-miniature BTS device 3. The paging signal here corresponds to "Paging Type 1 (TM: PCCH)" of the RRC message in 3GPP.

Figure 10:
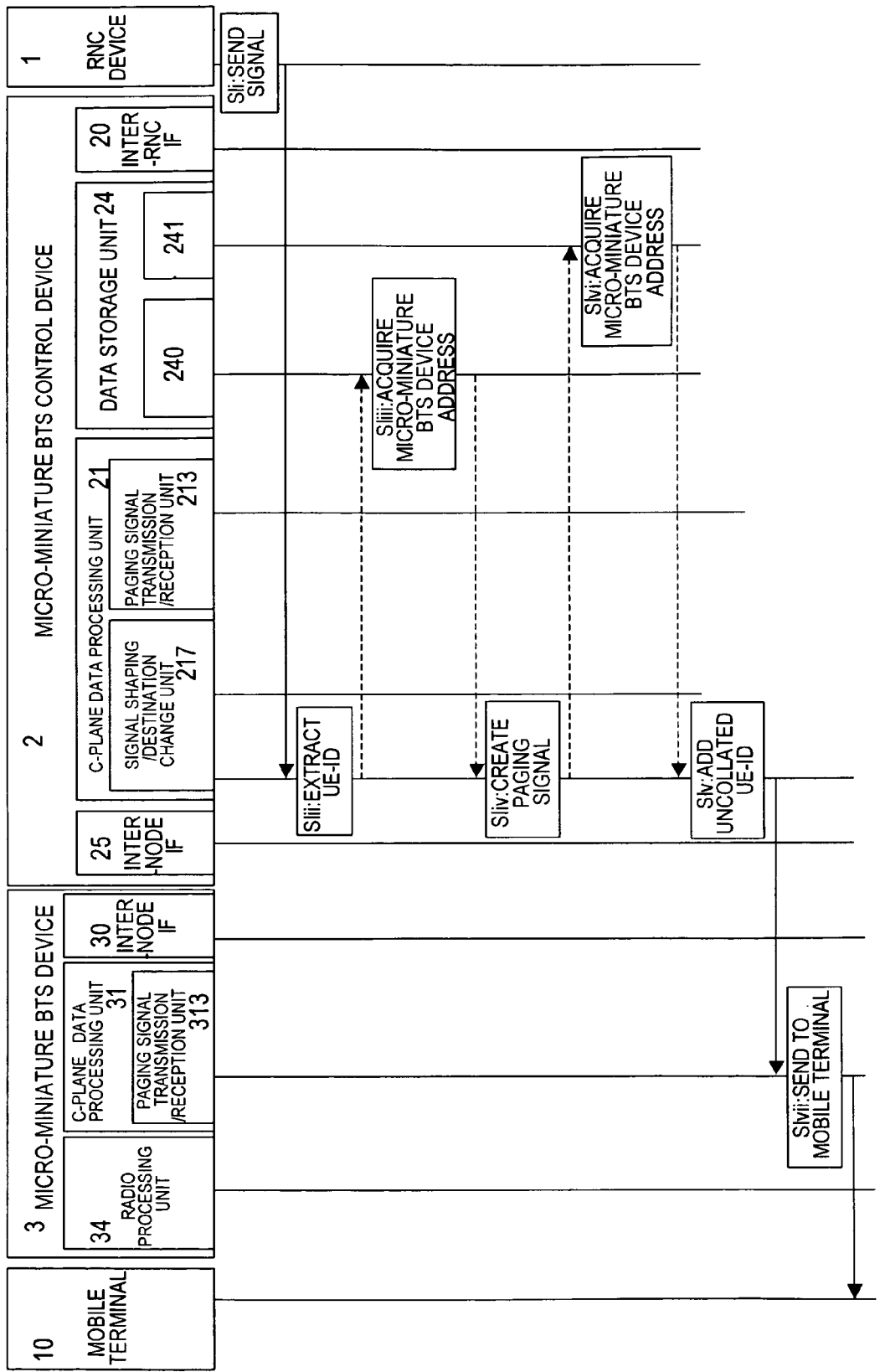
FIG. 10 is a diagram depicting a sequence example among each device in (2) paging (callup) processing to mobile terminal 10.

FIG. 10 is a diagram depicting a sequence example among each device in (2) paging (callup) processing to mobile terminal 10. In FIG. 10, the reference symbols SIi to SIvii show the flow of signals from the RNC device 1 to the mobile terminal 10.

SIi: A paging signal is sent from the RNC device 1 to the signal shaping/destination change unit 217 via the inter-RNC interface IF 20 in the micro-miniature BTS control device 2, through the paging signal receive unit 213 of the C-Plane data processing unit 21.

Figure 11:
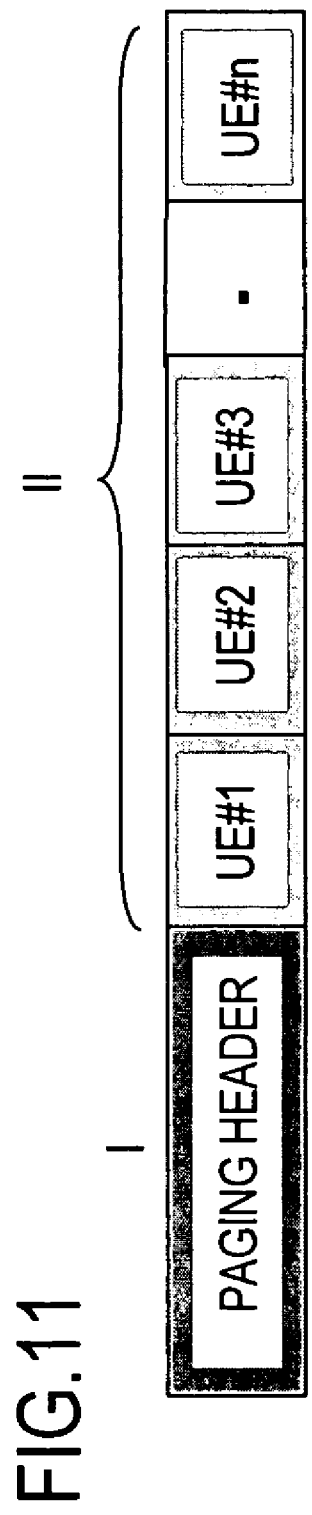
FIG. 11 shows an image of the paging signal.

An image of the paging signal is shown in FIG. 11. FIG. 11 shows an image of a MAC SDU, where a plurality of terminal IDs (UE-ID) (II) after the paging header (I) are shown.

SIii: The signal shaping/destination change unit 217 decodes the paging signal, and extracts the terminal ID in the paging signal shown in FIG. 11.

SIiii: The plurality of terminal IDs (UE-ID) extracted in SIii are collated with the mobile terminal data base 240 of the data storage unit 24, and if a mobile terminal 10 having the applicable ID (UE-ID) is included, the address of the micro-miniature BTS device 3, to which this mobile terminal 10 is subordinate, is acquired.

For example, if the terminal ID is UE=000001, the address of the micro-miniature BTS control device 3 is "10.10.10.1" according to the example of the recording format of the mobile terminal data base 240 shown in FIG. 9.

SIiv: Mobile terminals 10 which are subordinate to each micro-miniature BTS device 3 acquired in SIiii are sorted (separated), and a paging signal is created corresponding to the micro-miniature BTS device 3.

Figure 12:
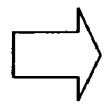
FIG. 12 shows the image of the paging signal after sorting.

The image after sorting is shown in FIG. 12. Compared with the source data (1) corresponding to the paging signal image in FIG. 11, an address (port number) for each micro-miniature BTS device 3 is attached after the paging header ((2) in FIG. 12).

SIv: If an uncollated mobile terminal ID (UE-ID), for which an address of the micro-miniature BTS device was not acquired, exists in SIiv, this uncollated mobile terminal ID (UE-ID) is added after the mobile terminal ID (UE-ID) sorted in SIiv in the paging signal.

Figure 13:
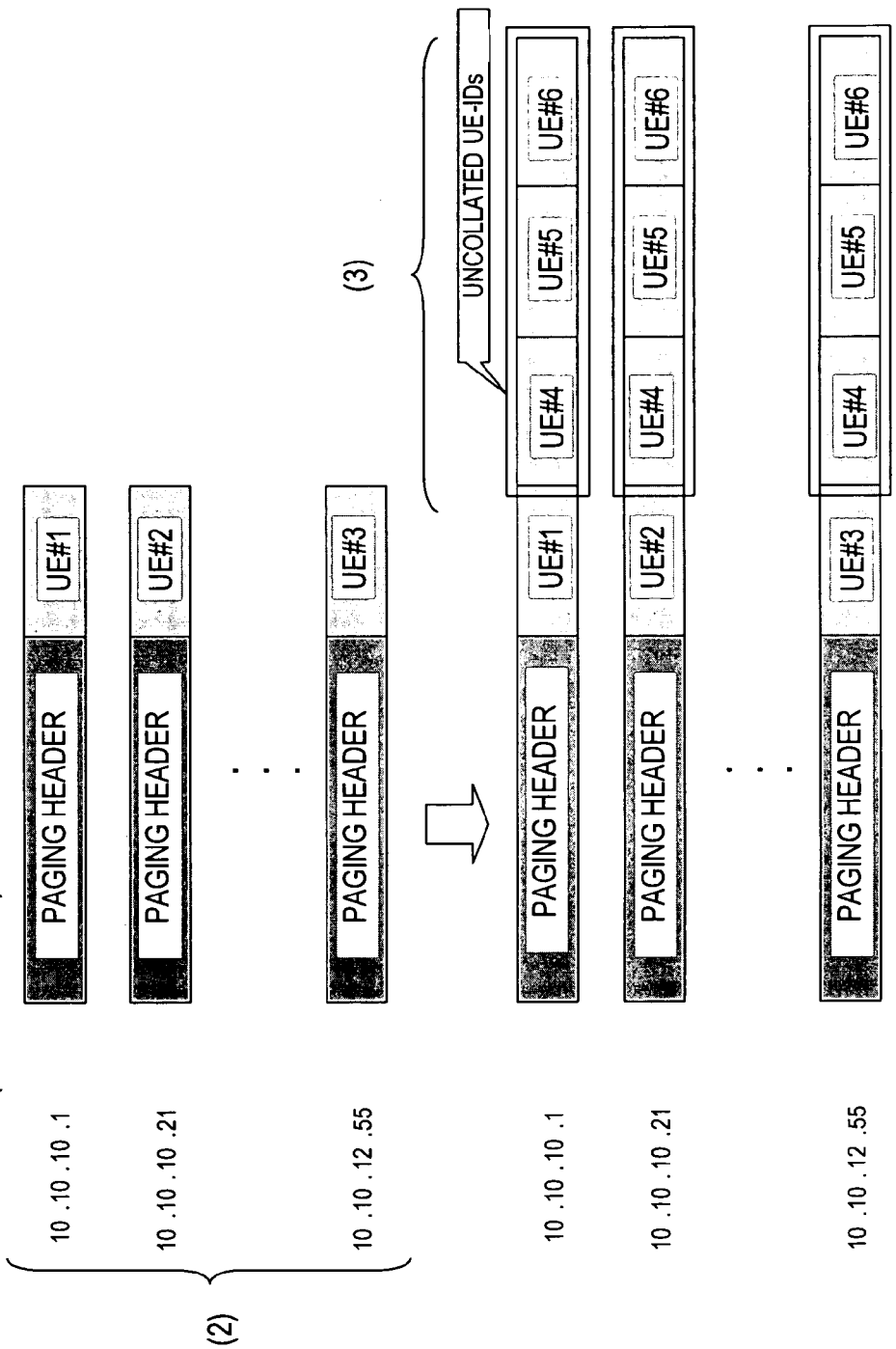
FIG. 13 is an example of image after addition where uncollated mobile terminal IDs (UE-IDs) are attached to the format image after the sorting.

An image after this addition is shown in FIG. 13. In FIG. 13, a plurality of uncollated mobile terminal IDs (UE-IDs) are attached to the format image ((2) in FIG. 13) after the sorting shown in FIG. 12 ((3) in FIG. 13). Thereby the attached plurality of uncollated mobile terminal IDs (UE-IDs), are broadcasted among the micro-miniature BTS devices to which the mobile terminal IDs (UE-IDs) collated in SIiii, are subordinate.

SIvi: As SIv shows, when a plurality of uncollated terminal IDs (UE-IDs) are processed, the plurality of uncollated mobile terminal IDs (UE-IDs) are added only to an address of a micro-miniature BTS device to which the collated mobile terminal ID (UE-ID) is subordinate, and are broadcasted.

It is also possible that a micro-miniature BTS device, to which the collated mobile terminal ID (UE-ID) is not subordinate, is called up.

Therefore, in order to perfect paging processing, the addresses of the micro-miniature BTS devices which are not included in the micro-miniature BTS device list acquired in SIiii (see FIG. 12) are acquired. Then the plurality of uncollated mobile terminal IDs (UE-IDs) are added so that these UE-IDs are broadcasted to the addresses of the micro-miniature BTS devices acquired in SIvi.

Figure 14:
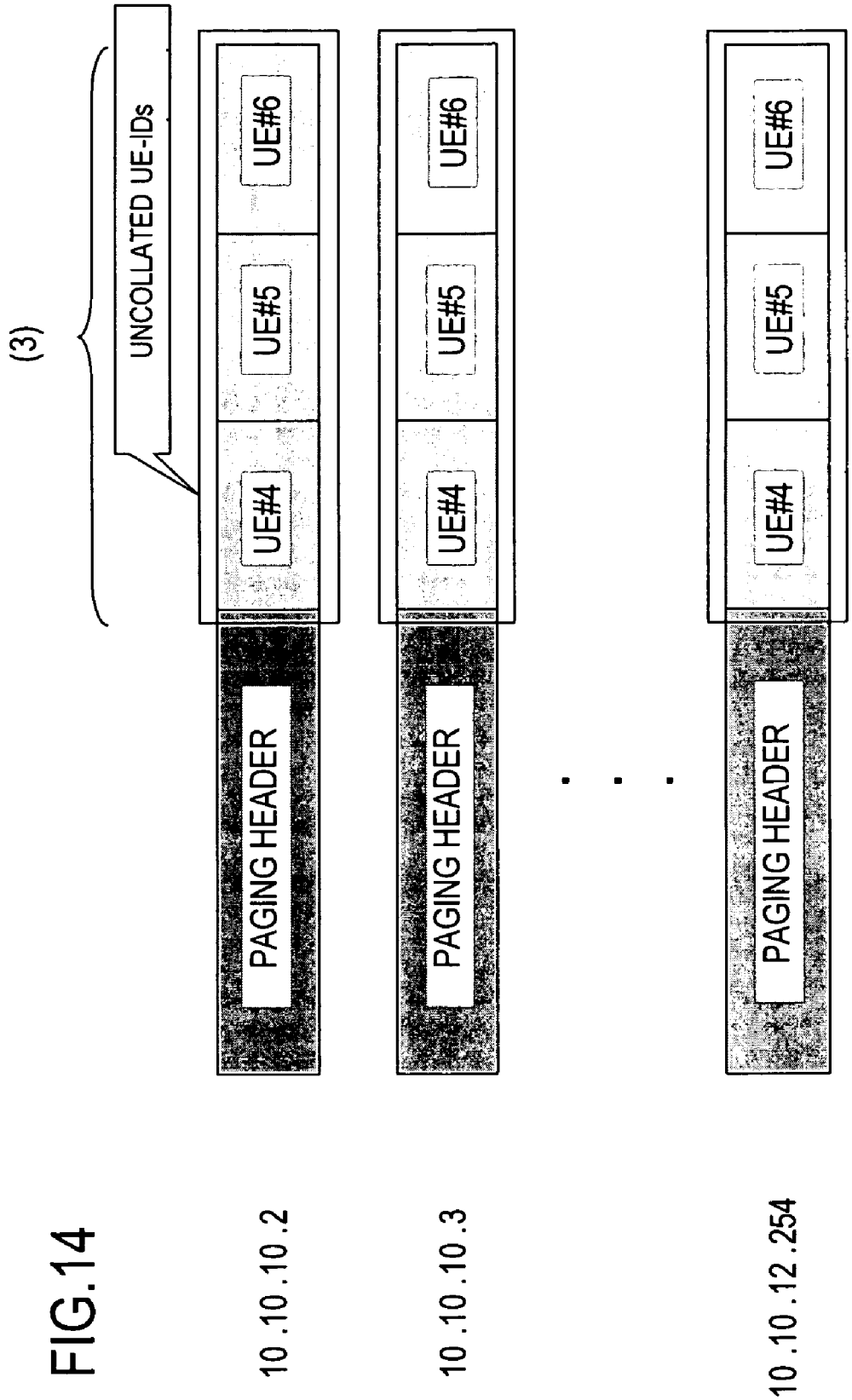
FIG. 14 shows the format image where the plurality of uncollated mobile terminal IDs (UE-IDs) are attached to the addresses of the micro-miniature BTS devices.

FIG. 14 shows the format image where the plurality of uncollated mobile terminal IDs (UE-IDs) are attached to the addresses of the micro-miniature BTS devices acquired in SIvi.

SIvii: Again referring to FIG. 10, the micro-miniature BTS control device 2 sends the paging signals shown in FIG. 13 and FIG. 14, where the uncollated mobile terminal IDs (UE-IDs) are attached in SIv, to the target micro-miniature BTS device 3 via the inter-node interface IF 25. The micro-miniature BTS device 3 sends the received paging signal to corresponding mobile terminals through the paging signal transmission/reception unit 313.

In (3) informative data processing to mobile terminal 10, an informative channel signal, which is transmitted from the RNC device 1, is sent to each micro-miniature BTS device 3.

Figure 15:
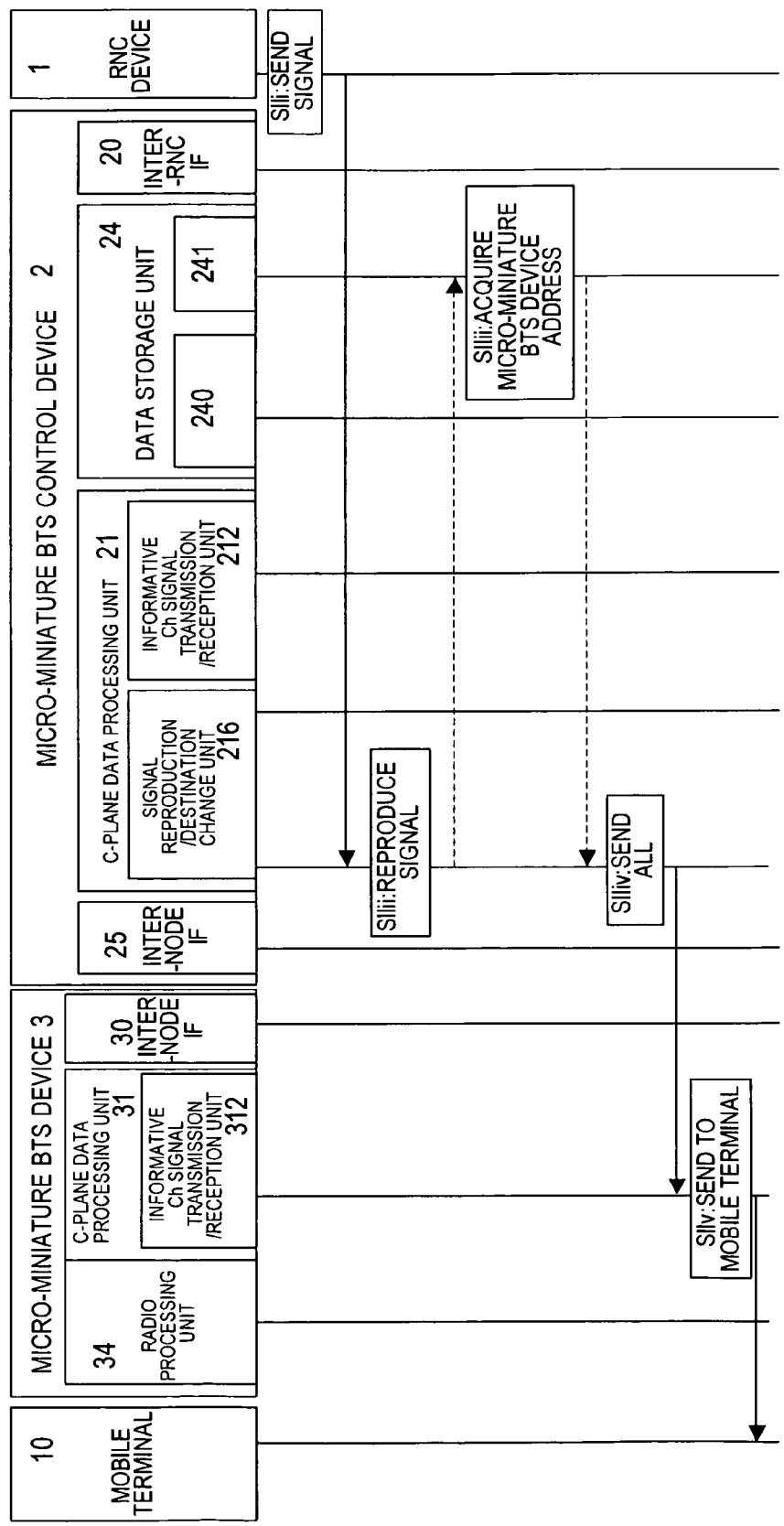
FIG. 15 is a diagram depicting a sequence example among each device in (2) paging (callup) processing to mobile terminal 10.

FIG. 15 is a diagram depicting a sequence example among each device in (2) paging (callup) processing to mobile terminal 10.

SIi: An informative channel signal is sent from the RNC device 1 to the informative channel signal reception unit 212 via the inter-RNC interface IF 20 in the micro-miniature BTS control device 2.

SIIii: Based on the received informative channel signal by the informative channel signal reception unit 212, the signal reproduction/destination change unit 216 acquires the IP address of the micro-miniature BTS device 3 in the station data base 241 of the data storage unit 24.

SIIiii: The informative signal is reproduced for a number of the acquired IP addresses.

SIIiv: The reproduced informative signals are sent to all the acquired IP addresses of the micro-miniature BTS device 3 in the station data via the inter-node interface IF 25.

SIIv: The micro-miniature BTS device 3 which received the informative channel signal using the informative channel signal transmission/reception unit 312 via the inter-node interface IF 30 sends this signal to all the subordinate mobile terminals 10 via the radio processing unit 34.

In (4) NBAP processing between the micro-miniature BTS control device 2 and micro-miniature BTS device 3, the NBAP signal sent from the RNC device 1 is sent to each micro-miniature BTS device 3.

Here the NBAP signal is a protocol for processing a signal between the RNC device 1 and the base station (Node B). Typical examples of an NBAP signal are "radio link setup request", "radio link setup response", "establish request", "establish confirm", "radio link deletion request" and "radio link deletion response".

These signals are generated in the call processing step of the mobile terminal 10 (mainly used for such control as bearer addition/delete between the base station and mobile terminal 10). Therefore, in order to associate the call processing of the mobile terminal 10 and these NBAP signals, it is necessary to specify information related to the identifier ID of the mobile terminal 10 in the NBAP signal, and route the NBAP signal to the micro-miniature BTS device 3 to which the mobile terminal 10 is subordinate.

Therefore, in the following processing content, a processing to extract information on the mobile terminal 10 from the NBAP signal data is performed, in order to implement processing of the NBAP signal appropriately.

Figure 16A:
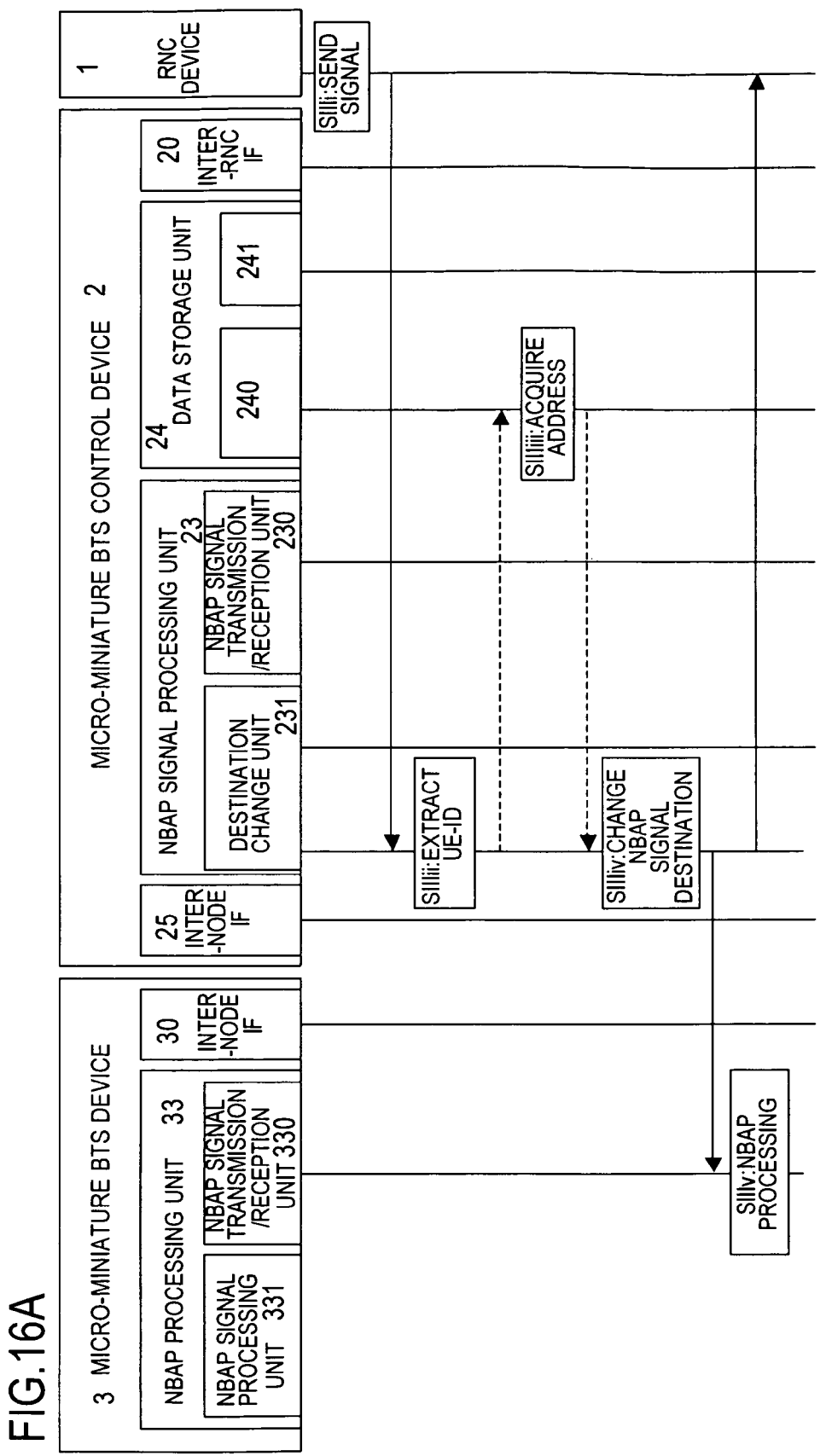
FIG. 16A is a diagram depicting a sequence example among each device in (4) NBAP processing between micro-miniature BTS control device 2 and micro-miniature BTS device 3 and shows the flow of signals from the RNC device 1 to the micro-miniature BTS device 3.

FIG. 16A and FIG. 16B are diagrams depicting a sequence example among each device in (4) NBAP processing between micro-miniature BTS control device 2 and micro-miniature BTS device 3.

FIG. 16A shows the flow of signals from the RNC device 1 to the micro-miniature BTS device 3 (SIIII to SIIIv). FIG. 16B shows the flow of signals from the micro-miniature BTS device 3 to the RNC device 1 (SIIIvi to SIIIviii).

SIIII: In FIG. 16A, the NBAP signal sent from the RNC device 1 is received by the NBAP signal transmission/reception unit 230 of the NBAP signal processing unit 23 via the inter-RNC interface IF 20 in the micro-miniature BTS control device 2, and is sent to the destination change unit 231.

Figure 17:
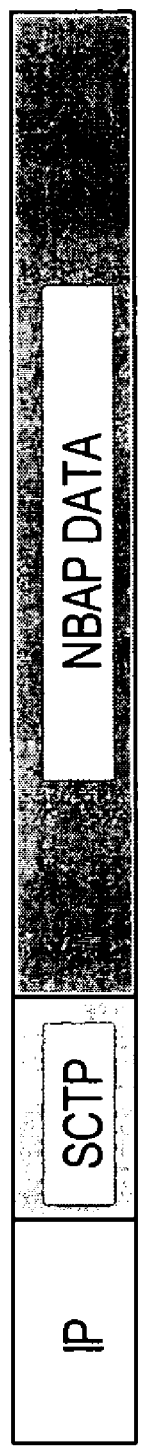
FIG. 17 shows a format image of the NBAP signal.

FIG. 17 shows a format image of the NBAP signal, and shows a case when the transmission type between the micro-miniature BTS device 3 and micro-miniature BTS control device 2 is IP packets, which are transmitted/received via the Internet network 100.

SIIIii: The destination change unit 231 which received the signal in SIIIi decodes the NBAP data, and acquires information to specify a mobile terminal 10, and extracts this mobile terminal 10 from the mobile terminal data base 240 of the data storage unit 24.

SIIIiii: The IP address and port number of the micro-miniature BTS device 3, to which the extracted mobile terminal 10 is subordinate, are acquired from the mobile terminal data base 240.

SIIIiv: The IP address and port number of the NBAP signal acquired in SIIIiii are replaced with those of the micro-miniature BTS device extracted in SIIIii, and sent to the micro-miniature BTS device 3 via the inter-node interface IF 25.

SIIIv: The micro-miniature BTS device 3 receives the IP address and port number of the micro-miniature BTS device acquired in SIIIii, which replaced the IP address and port number acquired in SIIIiii, using the NBAP signal transmission/reception unit 330 of the NBAP signal processing unit 33 via the inter-node interface IF 30, and performs processing using the NBAP signal processing unit 331.

SIIIvi: IN FIG. 16B, the NBAP signal processing unit 331 sends an NBAP signal to the NBAP signal processing unit 23 in the micro-miniature BTS control device 2 via the NBAP signal transmission/reception unit 330 according to the processing result of the NBAP signal processing unit 331 in the NBAP processing unit 33 of the micro-miniature BTS device 3.

SIIIvii: The destination of the NBAP signal is changed to the address of the RNC device 1 by the address change unit 231 of the NBAP signal processing unit 33, which received the NBAP signal transmitted in SIIIvi. In other words, the destination change unit 231 changes the transmission source address of the NBAP signal received from the micro-miniature BTS device 3 to the micro-miniature BTS control device 2, and changes the transmission destination address thereof to the RNC device 1. Then the NBAP signal is sent via the NBAP signal transmission/reception unit 230.

SIIIviii: The NBAP signal transmission/reception unit 230 sends the received NBAP signal to the RNC device 1 via the inter-RNC interface IF 20.

As described above, according to the present invention, many micro-miniature BTS devices 3 can be accommodated without modifying a conventional W-CDMA system, at los cost (by merely adding micro-miniature BTS control devices).

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention has been described in detail, it should be understood that the various changes, substitutions, and alterations could be made hereto without departing from the spirit and scope of the invention.

The invention claimed is:

1. A mobile communication system, comprising:
   a plurality of base stations which accommodate a plurality of mobile terminals respectively;
   a plurality of first base station control devices, each of which accommodates a predetermined number of base stations out of the plurality of base stations; and
   a second base station control device, connected to a core network, which accommodates the plurality of first base station control devices, wherein
   the plurality of first base station control devices respectively include, for supporting information identifying a mobile terminal, a mobile terminal data base to store identification information which identifies a base station to which the mobile terminal is subordinate, and a station data base to store an address of the base station, and
   in order to support information to identify a mobile terminal stored in the mobile terminal data base, the identification information on a base station to which the mobile terminal is subordinate is extracted based on a transmission data format, which is used when a signal is transmitted from the mobile terminal to the second base station control device.

2. The mobile communication system according to claim 1, wherein
   the plurality of base stations are micro-miniature base stations, and the plurality of first base station control devices are micro-miniature base station control devices, and the second base station control device is connected to a core network.

3. A mobile communication system comprising:
   a plurality of base stations which accommodate a plurality of mobile terminals respectively;
   a plurality of first base station control devices, each of which accommodates a predetermined number of base stations out of the plurality of base stations; and
   a second base station control device which accommodates the plurality of first base station control devices, wherein
   the plurality of first base station control devices respectively includes, for supporting information identifying a mobile terminal, a mobile terminal data base to store identification information which identifies a base station to which the mobile terminal is subordinate, and a station data base to store an address of the base station, wherein,
   the plurality of base stations are micro-miniature base stations, and the plurality of first base station control devices are micro-miniature base station control devices, and the second base station control device is connected to a core network, and wherein in order to support information to identify a mobile terminal stored in the mobile terminal data base, the identification information on a base station to which the mobile terminal is subordinate is extracted based on a transmission data format, which is used when a signal is transmitted from the mobile terminal to the second base station control device.

4. The mobile communication system according to claim 3, wherein
when a signal is transmitted from the mobile terminal to the second base station control device, the first base station control device regards a transmission source address as the base station, and a transmission destination address as the first base station control device if a transmission type, between the base station and the first base station control device, is based on IP packets, and the first base station control device replaces the transmission destination address with an address of the second base station control device, and transmits the data received from the base station.

5. A micro-miniature base station control device, in a mobile communication system including a plurality of base stations accommodating a plurality of mobile terminals, and one base station control device connected to a core network, a plurality of base station control devices allocated separately from the one base station control device connected to the core network, for accomodating a predetermined number of base stations out of the plurality of base stations,
the plurality of base station control devices respectively including, for supporting information to identify the mobile terminal, a mobile terminal data base, to store identification information which identifies a base station to which the mobile terminal is subordinate, and a station data base to store an address of the base station, wherein
the plurality of base stations are micro-miniature base stations, and the base station control device is a micro-miniature base station control device that supports the micro-miniature base stations, and
wherein
in order to support information to identify a mobile terminal stored in the mobile terminal data base, the identification information on a base station to which the mobile terminal is subordinate is extracted based on a transmission data format which is used when a signal is transmitted from the mobile terminal.

6. The micro-miniature base station control device according to claim 5, wherein
when a signal is transmitted from the mobile terminal to one base station control device connected to the core network, a transmission source address is regarded as the base station and a transmission destination address is regarded as the base station control device if a transmission type with the base station is based on IP packets, and
the base station control device replaces the transmission destination address with an address of the one base station control device connected to the core network, and transmits the data received from the base station.

7. The micro-miniature base station control device according to claim 6, wherein a call control signal exchanged with a mobile terminal can be transmitted or received among the mobile terminal, the base station control device and the core network.

8. The micro-miniature base station control device according to claim 6, wherein a user data signal exchanged with a mobile terminal can be transmitted or received among the mobile terminal, the base station control device and the core network.

9. The micro-miniature base station control device according to claim 6, wherein informative data, to be transmitted to all the mobile terminals which are subordinate to the micro-miniature base station control device, can be transmitted among the mobile terminals, the base station control device and the core network.

10. The micro-miniature base station control device according to claim 6, wherein a base station control signal to the micro-miniature base station can be transmitted or received between the micro-miniature base station and the base station control device.

11. The micro-miniature base station control device according to claim 10, wherein when a paging signal is received from a mobile terminal which does not exist in the mobile terminal data base, the paging signal addressed to the mobile terminal is transmitted to all of the micro-miniature base stations to which the mobile terminal is subordinate.

12. The micro-miniature base station control device according to claim 6, wherein a paging signal, to be transmitted to the micro-miniature base station control device, is optimized and transmitted to the micro-miniature base station based on the mobile terminal data base so that the paging signal is transmitted only to the mobile terminal which is subordinate to the micro-miniature base station.

\* \* \* \* \*